3,077,551
TRANSISTOR RESISTANCE MONITOR

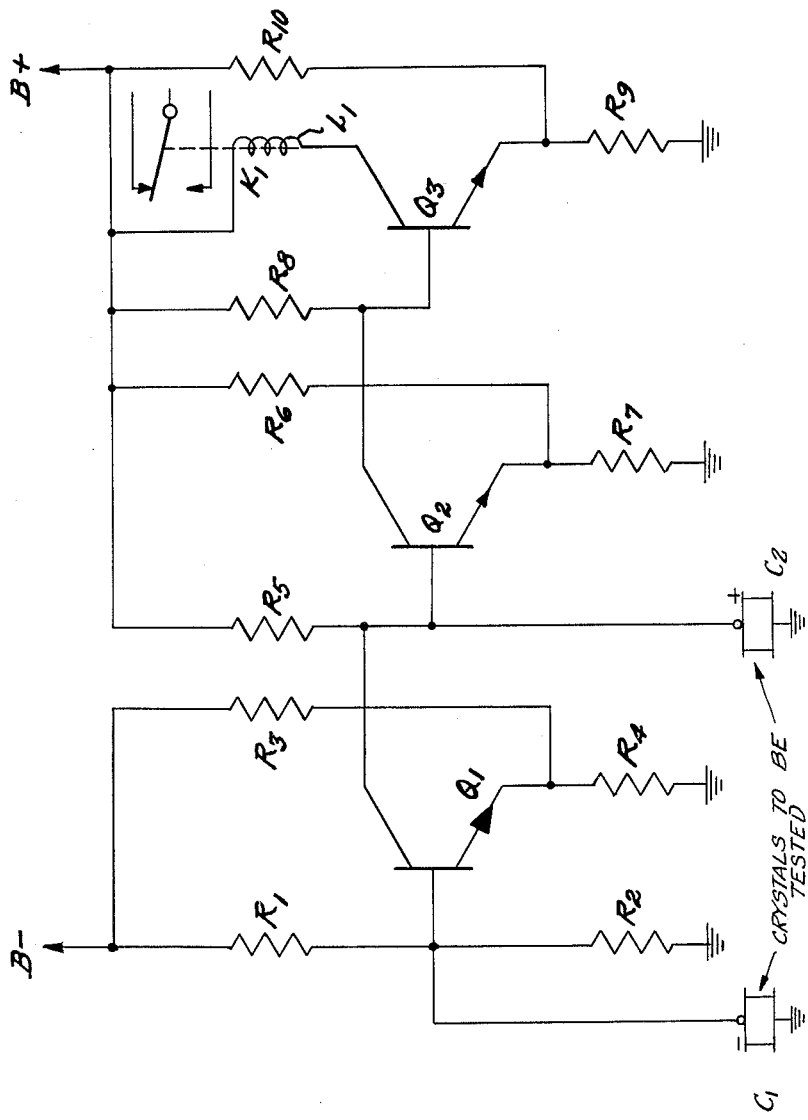
INVENTORS
HAROLD B. NELSON
AND FLOYD R. SCRIPTURE
BY
ATTORNEYS

Harold B. Nelson, Natick, and Floyd R. Scripture, Stoughton, Mass., assignors to the United States of America as represented by the Secretary of the Air Force
Filed Dec. 9, 1958, Ser. No. 779,265
2 Claims. (Cl. 317—148.5)

This invention relates to monitoring devices and has particular reference to transistor circuitry for monitoring a resistance.

The device of this invention is intended to be used with monitors of various components or circuits of a radar or other electronic system to form an automatic failure prediction system whereby impending equipment failure may be recognized before an actual shutdown of the monitored equipment is necessary. Upon recognition of imminent failure, standby units may be substituted or repairs made, thereby enabling a substantially continuous operation of the equipment. Reliability of the monitored components may be considered to be increased because components will be replaced prior to actual failure. Furthermore, monitoring enables complete analysis of system operation which facilitates improvement of equipment design or compensation in operation to enhance the equipment reliability. To accomplish the purposes of monitoring it is necessary to design the monitor with a reliability which is greater than the equipment to be monitored.

Accordingly, it is an object of this invention to produce a resistance monitor having good reliability.

It is also an object of this invention to produce a monitoring unit which enables substantially continuous operation of monitored equipment by producing a signal on impending circuit failure.

It is another object of this invention to produce an improved resistance monitor.

It is a further object of this invention to produce an improved transistorized resistance monitor capable of producing a signal when the monitored circuit resistance is reduced to a predetermined value.

It is a still further object of this invention to produce a monitoring unit which utilizes conventional, currently available components that lend themselves to standard mass production manufacturing techniques.

These and other advantages, features and objects will become more apparent from the following description taken in conjunction with the illustrative embodiment in the drawing wherein the FIGURE illustrates schematically a transistor monitor circuit adapted for low voltage application to the measured circuit.

Referring to the figure, the design presented has been tailored for checking a crystal located in a circuit of a radar system. A study of the failure rate of crystal units indicated a necessity for measuring the D.-C. back resistance of the crystal, since it was found that the noise figure increased rapidly as the back resistance dropped below approximately 10,000 ohms.

Since an advance indication of impending failure is desired, the resistance monitor of this invention is arranged to give a warning when the back resistance of a crystal drops to the vicinity of 15,000 to 20,000 ohms.

The transistorized resistance monitor of this invention comprises three transistors and associated circuitry and a relay $K_1$. Transistor $Q_1$ operates when a negative voltage is needed to check a crystal and may be omitted when only a reversed polarity is required. Transistor $Q_1$ is connected to a negative potential B− through base bias resistor $R_1$. The crystal $C_1$ to be monitored requiring a negative test voltage is placed in parallel with resistor $R_2$, this parallel arrangement being connected to the base of transistor $Q_1$. An emitter bias resistor $R_3$ is connected with the source of negative potential to the emitter of $Q_1$ and to an emitter resistor $R_4$. The collector of $Q_1$ is connected with the base of transistor $Q_2$ of the next stage. Since transistor $Q_2$ is for positive voltage applicatoin to a crystal $C_2$, a source of positive potential B+ is connected through collector load and base bias resistor $R_5$ to the base of $Q_2$ and also to the crystal under test. The emitter of $Q_2$ is connected to the B+ voltage through a resistor $R_6$ and to ground potential through a resistor $R_7$. The collector of $Q_2$ connects to the base of transistor $Q_3$ in the next stage which transistor operates relay $K_1$. The base of $Q_3$ is also connected with the B+ voltage by means of its collector load and base bias resistor $R_8$.

The emitter of transistor $Q_3$ is connected to the B+ potential through emitter bias resistor $R_{10}$ and to ground potential through emitter resistor $R_9$. The collector of $Q_3$ is connected through the coil $L_1$ of relay $K_1$ to B+.

The operation of the circuit will now be described, assuming that a positive test voltage is to be applied to a crystal $C_2$. Initally, the monitoring circuit will be operating with transistors $Q_1$ and $Q_3$ biased to cut-off and with $Q_2$ biased to saturation. If, upon connection of $C_2$ to the circuit, a high resistance is sampled, no change will occur in the condition of the circuit, the current through $Q_2$ remaining at the saturation level and the relay $K_1$ remaining inoperative.

As crystal $C_2$ deteriorates, its resistance decreases. If upon connection of $C_2$ to the circuit, such a decreased resistance is sampled, the base bias voltage of $Q_2$ will decrease toward ground potential. This tends to make the base of $Q_2$ more negative than the emitter, and tends to cut off the collector current of $Q_2$, resulting in a more positive base bias for $Q_3$. Upon conduction of $Q_3$, a voltage will be produced across coil $L_1$ which, upon reaching a predetermined value, will cause relay $K_2$ to operate. Conduction of $Q_3$ will occur when crystal $C_2$ has deteriorated so as to reduce its resistance below a certain value.

To monitor crystal $C_1$, to which a negative test voltage must be applied, the crystal is connected to the base of transistor $Q_1$, as shown in the drawing. Initially, $Q_1$ and $Q_3$ are at cut-off, while $Q_2$ is conducting at saturation. If, in testing $C_1$, a high resistance is sampled, the circuit will remain in its initial condition and relay $K_1$ will not be operated. If, on the other hand, $C_1$ has deteriorated so that a decreased resistance is sampled, the voltage at the base of $Q_1$ will increase from a negative value toward ground potential. When the base bias voltage becomes sufficiently positive with respect to the emitter bias, $Q_1$ will conduct. The collector current through $Q_1$ will reduce the base bias voltage at $Q_2$, driving $Q_2$ to cut-off and causing $Q_3$ to start conducting. When the resistance of $C_2$ has sufficiently deteriorated, relay $K_1$ will operate to provide an indication that the measured resistance of the crystal has decreased below a certain value. A lamp or some other indicator may be connected to the relay to provide notification of a low resistance.

Although not limited thereto, the following set of values may be utilized to produce plus or minus 1 volt test voltages utilizing npn transistors in the monitoring circuit.

$R_1$ _____ 240K.
$R_2$ _____ 22K.
$R_3$ _____ 4.7K.
$R_4$ _____ 240K.
$R_5$ _____ 430K.
$R_6$ _____ 6.2K.
$R_7$ _____ 270K.

| | |
|---|---|
| $R_8$ | 130K. |
| $R_9$ | 270K. |
| $R_{10}$ | 6.2K. |
| $L_1$ | 5K resistance. |
| B+ | 22.5 v. |
| B— | —22.5 v. |

To improve the reliability of the test circuit cooling means should be provided to avoid overheating of the transistors.

Thus, it is apparent that an improved resistance monitor operating at low levels across the monitored circuit has been developed.

Although the invention has been described with reference to a particular embodiment, it will be understood to those skilled in the art that the invention is capable of a variety of alternative embodiments within the spirit and scope of the appended claims.

We claim:

1. In combination with a current source and a pair of transistors, having grounded emitter electrodes, a pair of parallel current paths leading from said current source to the collector electrodes of the respective transistors, the first of said paths including a resistance unit, the second including a relay winding, and a test component subject to progressive deterioration, said test component being connected to the base electrode of the first of said transistors, and normally operating to cause said first current path to receive the preponderance of the current flowing from said current source, so that the current flowing from said source to said relay winding is insufficient to operate the relay, but becomes of progressively increasing magnitude as the progressive deterioration of said test component reduces the current flow in said first path and correspondingly increases the current flow to said relay winding, until eventually said relay winding receives sufficient current to operate the relay.

2. Apparatus as defined in claim 1, including third and fourth current paths from said current source to the grounded emitter sides of the respective transistors, said third and fourth paths including resistance units of equal magnitude, which magnitude is substantially less than that of said first-named resistance unit.

References Cited in the file of this patent

UNITED STATES PATENTS

| | | |
|---|---|---|
| 2,828,450 | Pinckaers | Mar. 25, 1958 |
| 2,848,658 | Mitchell | Aug. 19, 1958 |
| 2,852,702 | Pinckaers | Sept. 16, 1958 |
| 2,864,978 | Frank | Dec. 16, 1958 |

OTHER REFERENCES

"Headlight Dimmer," Radio and Television News, August 1955, pp. 56, 57 and 122.